United States Patent
Xiang et al.

(10) Patent No.: US 12,079,651 B2
(45) Date of Patent: Sep. 3, 2024

(54) SERVERLESS APPLICATION FUNCTION EXECUTION

(71) Applicant: International Business Machines Corporation, Armonk, NY (US)

(72) Inventors: Min Xiang, Beijing (CN); Yue Wang, Beijing (CN); Wen Rui Zhao, Beijing (CN); Xu Hui Bai, Beijing (CN); Li Na Yuan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 17/305,774

(22) Filed: Jul. 14, 2021

(65) Prior Publication Data

US 2023/0014233 A1    Jan. 19, 2023

(51) Int. Cl.
  *G06F 9/455*    (2018.01)
  *G06F 11/07*    (2006.01)
  *G06F 11/14*    (2006.01)

(52) U.S. Cl.
  CPC ...... *G06F 9/45558* (2013.01); *G06F 11/0757* (2013.01); *G06F 11/1448* (2013.01); *G06F 11/1484* (2013.01); *G06F 2009/4557* (2013.01); *G06F 2009/45575* (2013.01); *G06F 2009/45579* (2013.01); *G06F 2201/84* (2013.01)

(58) Field of Classification Search
  None
  See application file for complete search history.

(56) References Cited

U.S. PATENT DOCUMENTS

| | | | |
|---|---|---|---|
| 7,793,157 B2 | 8/2010 | Bailey et al. | |
| 10,855,812 B1 * | 12/2020 | Tatsumi | H04L 67/63 |
| 10,860,444 B2 | 12/2020 | Natanzon | |
| 11,216,343 B1 * | 1/2022 | Emelyanov | G06F 9/45533 |
| 2015/0326667 A1 | 11/2015 | Kappes et al. | |
| 2019/0007458 A1 * | 1/2019 | Shulman | H04L 63/1433 |

FOREIGN PATENT DOCUMENTS

| | | |
|---|---|---|
| CN | 102255933 A | 11/2011 |
| KR | 101227267 B1 | 1/2013 |

OTHER PUBLICATIONS

Zhang, Wen, Vivian Fang, Aurojit Panda, and Scott Shenker. "Kappa: A programming framework for serverless computing." In Proceedings of the 11th ACM Symposium on Cloud Computing, pp. 328-343. 2020. (Year: 2020).*

(Continued)

*Primary Examiner* — Frank D Mills
(74) *Attorney, Agent, or Firm* — Yee & Associates, P.C.

(57) ABSTRACT

Executing serverless application functions is provided. A response to a user request for a service is received with an include callback parameter and a transaction identifier of the user request included in a header of the response from an external service via a network. A checkpoint of a container corresponding to the service is retrieved from a data store using the transaction identifier of the user request. The container corresponding to the service is restored using the checkpoint to process the response received from the external service.

20 Claims, 6 Drawing Sheets

(56) References Cited

OTHER PUBLICATIONS

Hall, Adam, and Umakishore Ramachandran. "An execution model for serverless functions at the edge." In Proceedings of the International Conference on Internet of Things Design and Implementation, pp. 225-236. 2019. (Year: 2019).*

Pérez, Alfonso, Germán Moltó, Miguel Caballer, and Amanda Calatrava. "Serverless computing for container-based architectures." Future Generation Computer Systems 83 (2018): 50-59. (Year: 2018).*

"Knative Eventing," Copyright 2021, The Knative Authors, accessed Jul. 1, 2021, 2 pages. https://knative.dev/docs/eventing/.

"What is Durable Functions?," Azure Docs, English Translation Included, accessed Jul. 1, 2021, 18 pages. https://docs.azure.cn/zh-cn/azure-functions/durable/durable-functions-overview?tabs=javascript.

Yang, "Checkpoint and Restoration of Micro-service in Docker Containers," 3rd International Conference on Mechatronics and Industrial Informatics (ICMII 2015), Oct. 2015, 4 pages. https://www.atlantis-press.com/proceedings/icmii-15/25844460.

Karhula et al., "Checkpointing and Migration of IoT Edge Functions," Proceedings of the 2nd International Workshop on Edge Systems, Analytics and Networking (EdgeSys '19,) Mar. 2019, 6 pages.

Jellema, "First steps with Docker Checkpoint—to create and restore snapshots of running containers," Apr. 8, 2018, AMIS Conclusion Technology Blog, accessed Apr. 8, 2021, 19 pages. https://technology.amis.nl/platform/docker/first-steps-with-docker-checkpoint-to-create-and-restore-snapshots-of-running-containers/.

"Serverless Computing With Knative and Containers as a Service (CaaS)," Technology Conversations, Aug. 19, 2020, accessed Apr. 8, 2021, 17 pages. https://technologyconversations.com/2020/08/19/serverless-computing-with-knative-and-containers-as-a-service-caas/.

Vijayan, "Implementing Long Running Serverless Functions with AWS Lambda," Apr. 10, 2020, Medium, accessed Apr. 8, 2021, 7 pages. https://medium.com/@vsaravind007/implementing-long-running-serverless-functions-with-aws-lambda-fe06d97120b2.

"Serverless architecture considerations," Serverless Apps, Microsoft Docs, Apr. 6, 2020, accessed Apr. 8, 2021, 5 pages. https://docs.microsoft.com/en-us/dotnet/architecture/serverless/serverless-architecture-considerations.

* cited by examiner

SERVERLESS APPLICATION FUNCTION EXECUTION

BACKGROUND

1. Field

The disclosure relates generally to serverless applications and more specifically to executing a serverless application function, which corresponds to a user-requested service, that is long running or calls an external service using the same container to run the serverless application function after expiration of a defined maximum threshold amount of execution time based on a callback tag added to code of the serverless application function.

2. Description of the Related Art

Serverless is a computing execution model that allows application developers to build and run applications without having to manage servers. Typically, when application developers refer to serverless, the application developers are referring to a Function-as-a-Service (FaaS) computing execution model. FaaS is an event-driven computing execution model where application developers write code that is deployed in containers managed by a container orchestration platform, then executed on demand. The container orchestration platform may be, for example, Kubernetes® (a registered trademark of the Linux Foundation of San Francisco, Calif.), which provides a platform for automating deployment, scaling, and operations of application containers across clusters of host nodes.

Servers still exist in serverless, but the servers are abstracted away from application development. A computing platform provider handles the work of provisioning, maintaining, managing, and scaling the server infrastructure. Application developers can simply package their application code in containers for deployment. In other words, serverless applications are deployed in containers that automatically launch on demand when called.

Once deployed, serverless applications respond to demand and automatically scale up and down as needed. A serverless offering managed by a computing platform provider is usually metered on-demand through an event-driven computing execution model. As a result, when a serverless application function is sitting idle, the serverless application function does not cost an entity anything. The entity may be, for example, an enterprise, company, business, organization, institution, agency, or the like, that provides the code of a serverless application function corresponding to a service.

Currently, execution time of a serverless application function in a FaaS computing execution model of a container orchestration platform is limited by a default value of 3 minutes but may be increased to a maximum execution time of 10 minutes. However, many serverless application functions need more than 10 minutes to complete execution. For example, a serverless application function calling an external database for a response to a user requested service can take more than 10 minutes to complete. As a result, the serverless application function can exceed the FaaS maximum execution time limit and timeout causing delay and disruption of the user requested service decreasing system performance by increasing system disk, processor, and memory utilization, thereby increasing cost to the entity providing the service.

SUMMARY

According to one illustrative embodiment, a computer-implemented method for executing serverless application functions is provided. A computer receives a response to a user request for a service with an include callback parameter and a transaction identifier of the user request included in a header of the response from an external service via a network. The computer retrieves a checkpoint of a container corresponding to the service from a data store using the transaction identifier of the user request. The computer restores the container corresponding to the service using the checkpoint to process the response received from the external service. According to other illustrative embodiments, a computer system and computer program product for executing serverless application functions are provided. As a result, the illustrative embodiments increase system performance by decreasing system disk, processor, and memory utilization using the same container to continue to run the service.

The illustrative embodiments also permissively receive code of a serverless application function that corresponds to the service from a client device of an application developer via the network, perform a scan of the code of the serverless application function to determine whether the code indicates that the serverless application function will run for more than a defined maximum threshold amount of time to generate the response to the user request for the service or will call the external service for the response, determine whether the code indicates that the serverless application function will run for more than the defined maximum threshold amount of time or will call the external service based on the scan, add a callback tag to the code of the serverless application function in response to the computer determining that the code does indicate that the serverless application function will run for more than the defined maximum threshold amount of time or will call the external service based on the scan, and store the code of the serverless application function with the callback tag added to the code in the data store. The illustrative embodiments further permissively determine that a defined maximum threshold amount of time has been exceeded, generate the checkpoint for the container corresponding to the service in response to the defined maximum threshold amount of time having been exceeded, and save the checkpoint of the container corresponding to the service in the data store along with the transaction identifier of the user request. As a result, the illustrative embodiments enhance execution of serverless application functions that are long running or call an external service by using the same containers to run corresponding serverless application functions of requested services after expiration of the defined maximum threshold amount of execution time based on the callback tag being added to the code of the serverless application functions and the checkpoints of the containers used to restore the containers.

DETAILED DESCRIPTION

Figure 1:
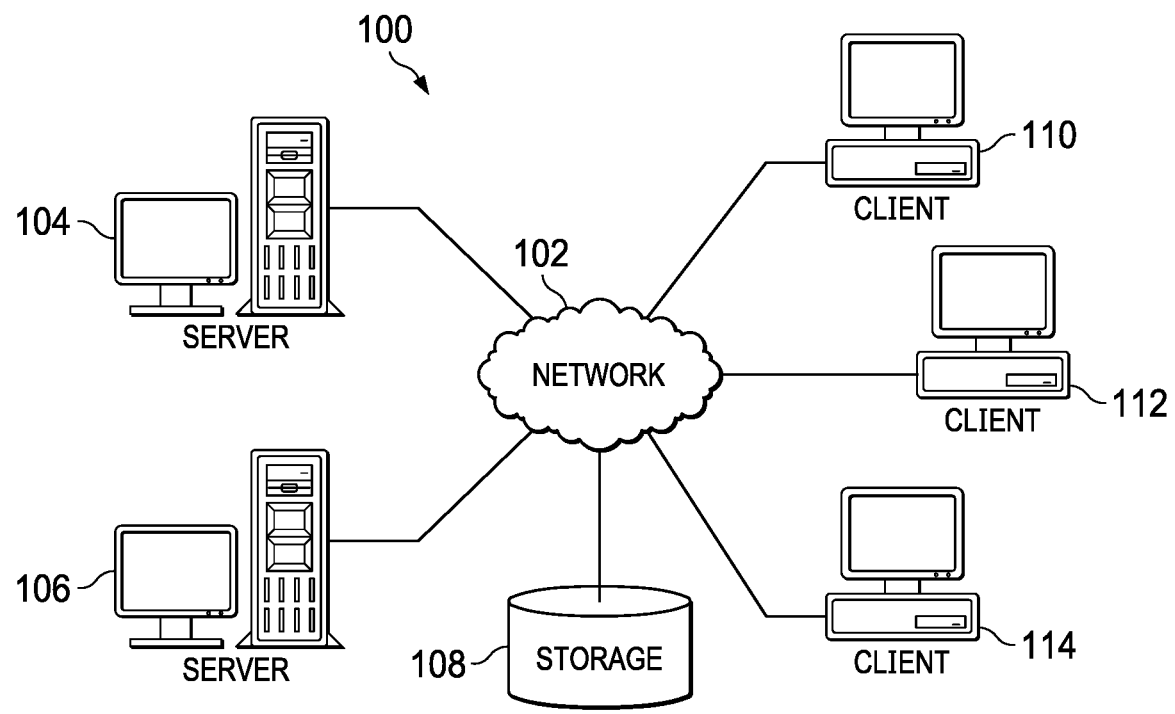
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
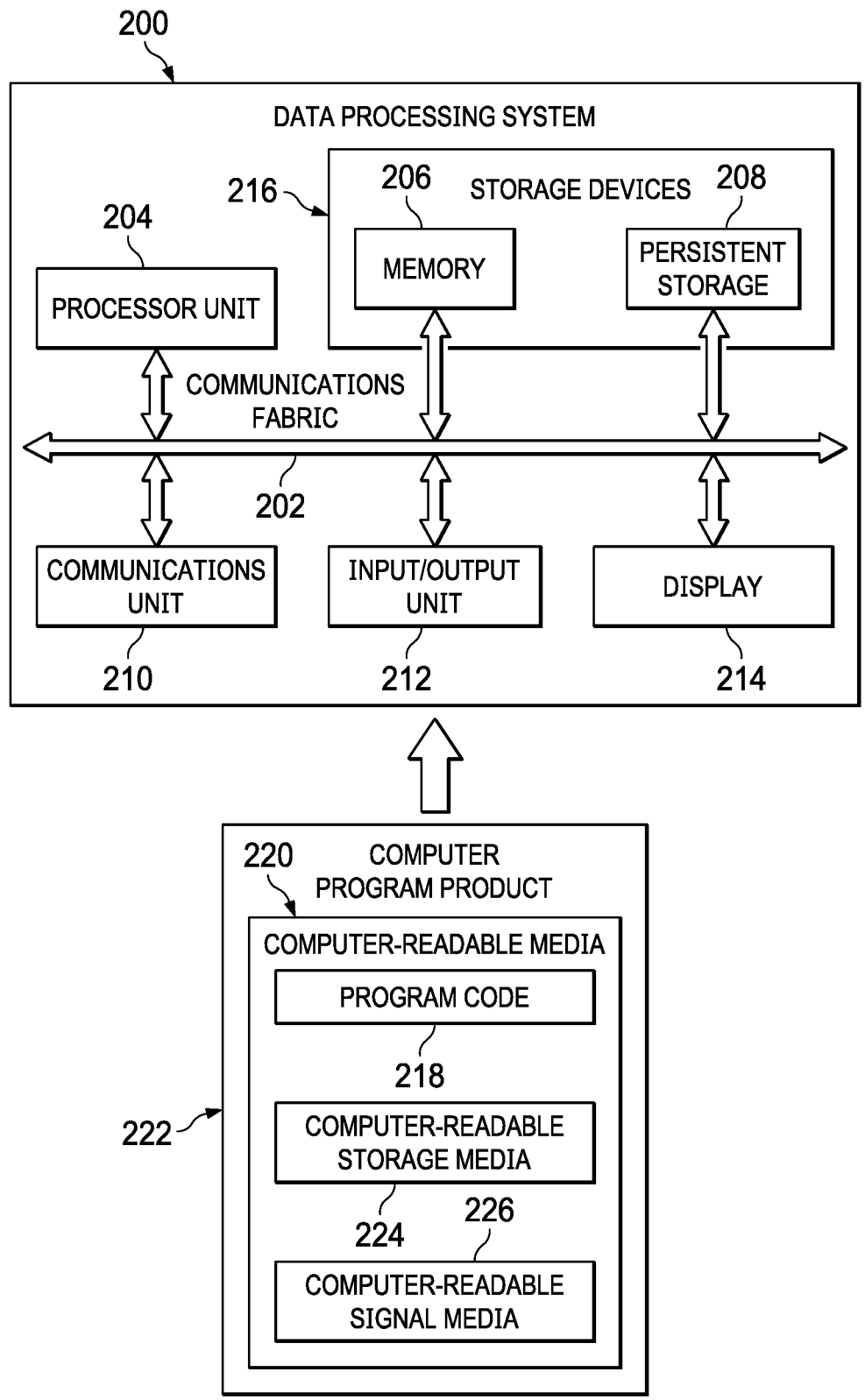
FIG. 2 is a diagram of a data processing system in which illustrative embodiments may be implemented.
Figure 3:
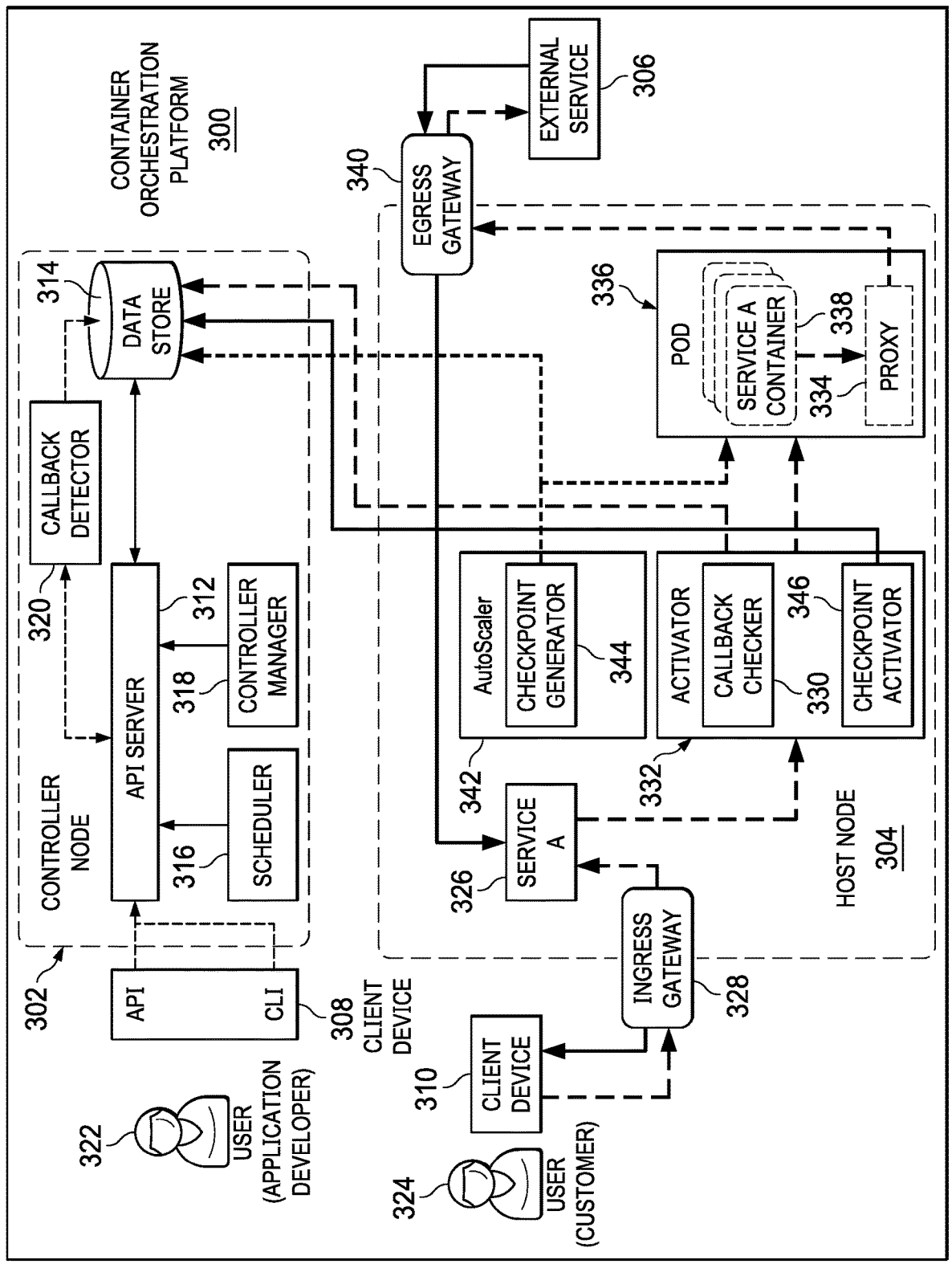
FIG. 3 is a diagram illustrating an example of a container orchestration platform in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. In this example, network data processing system 100 represents a container orchestration platform, such as Kubernetes. However, it should be understood that Kubernetes is intended as an example architecture only and not as a limitation on illustrative embodiments. In other words, illustrative embodiments may utilize any type of container orchestration platform, architecture, or environment that provides automated deployment, scaling, and operations of application containers across host nodes.

Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent a cluster of servers in one or more on-premises data centers. Alternatively, server 104 and server 106 may each represent multiple computing nodes in one or more cloud environments.

In addition, server 104 and server 106 provide a set of services, such as, for example, financial services, banking services, healthcare services, transaction services, governmental services, educational services, entertainment services, reservation services, insurance services, data services, and the like, to client device users. For example, server 104 and server 106 execute serverless application functions, which correspond to user-requested services, that can be long running (e.g., greater than 10 minutes) or call external services or systems using the same container to run the serverless application function even though the defined maximum threshold amount of execution time has been exceeded based on a callback tag added to code of the serverless application function. A container runs the application workload. A container runtime holds the running application, libraries, and their dependencies of the corresponding service. While the term container is generally used in the Kubernetes paradigm, the term as used herein is not limited to that environment but rather refers to any type of container where application workloads are deployed and hold the running applications, libraries, and their dependencies.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, smart vehicles, smart glasses, smart appliances, gaming devices, kiosks, and the like, with wire or wireless communication links to network 102. Users of clients 110, 112, and 114 may utilize clients 110, 112, and 114 to access and utilize the services provided by server 104 and server 106.

Further, application developers may utilize client devices to provide code for serverless application functions to server 104 and server 106 for deployment and scaling. The code of the serverless application functions run to the set of services provided by server 104 and server 106. Furthermore, server 104 and server 106 can scan the code to determine whether a particular serverless application function is long running or calls an external service. If the code indicates that a particular serverless application function is long running or calls an external service, then server 104 and server 106 can add a callback tag to the code of that particular serverless application function for restoring the container running the service after expiration of the defined maximum threshold amount of execution time using a checkpoint or snapshot of the container to continue processing a response to the service request.

Storage 108 is a network storage device capable of storing any type of data in a structured format or an unstructured format. In addition, storage 108 may represent a plurality of network storage devices. Further, storage 108 may store identifiers and network addresses for a plurality of servers, identifiers and network addresses for a plurality of client devices, identifiers for a plurality of client device users, code for a plurality of serverless application functions that correspond to different services, transaction identifiers corresponding to a plurality of user requests for services, a plurality of container checkpoints, and the like. Furthermore, storage 108 may store other types of data, such as authentication or credential data that may include usernames, passwords, and the like associated with client device users, application developers, and system operators, for example.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the serverless application function execution processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 218 is located in a functional form on computer-readable media 220 that is selectively removable and may be loaded onto or transferred to data processing system 200 for running by processor unit 204. Program code 218 and computer-readable media 220 form computer program product 222. In one example, computer-readable media 220 may be computer-readable storage media 224 or computer-readable signal media 226.

In these illustrative examples, computer-readable storage media 224 is a physical or tangible storage device used to store program code 218 rather than a medium that propagates or transmits program code 218. Computer-readable storage media 224 may include, for example, an optical or magnetic disc that is inserted or placed into a drive or other device that is part of persistent storage 208 for transfer onto a storage device, such as a hard drive, that is part of persistent storage 208. Computer-readable storage media 224 also may take the form of a persistent storage, such as a hard drive, a thumb drive, or a flash memory that is connected to data processing system 200.

Alternatively, program code 218 may be transferred to data processing system 200 using computer-readable signal media 226. Computer-readable signal media 226 may be, for example, a propagated data signal containing program code 218. For example, computer-readable signal media 226 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 220" can be singular or plural. For example, program code 218 can be located in computer-readable media 220 in the form of a single storage device or system. In another example, program code 218 can be located in computer-readable media 220 that is distributed in multiple data processing systems. In other words, some instructions in program code 218 can be located in one data processing system while other instructions in program code 218 can be located in one or more other data processing systems. For example, a portion of program code 218 can be located in computer-readable media 220 in a server computer while another portion of program code 218 can be located in computer-readable media 220 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 218.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

FaaS is a serverless application execution environment that is based on a container orchestration platform, such as, for example, Kubernetes. However, it should be understood that Kubernetes is intended as an example only. In other words, any type of container orchestration platform may be used for the serverless application execution environment. For example, FaaS can orchestrate serverless application workloads across different computing execution environments.

The serverless application development process includes code and configuration, which leads to build, deployment, and running. The application developer builds the code into a container and binds the serverless application function with an event to trigger the serverless application function to run when the event occurs. The container orchestration platform performs routing and workload control by automatically scaling up or scaling down to perform the service corresponding to the triggered serverless application function. In other words, the serverless application function is a service provided to requesting client device users. Thus, the serverless application function is an independent unit of deployment, such as, for example, a microservice. The serverless application function is code, which is deployed in a computing execution environment.

Using a FaaS computing execution model, when an application developer develops and deploys a serverless application function in the container orchestration platform, function execution time is limited by a defined maximum threshold amount of time (e.g., 3-10 minutes). However, execution time of deployed serverless application functions may need more than 3-10 minutes to complete when, for example, calling an external database service for a response. As a result, the serverless application function can exceed the FaaS maximum execution time limit and timeout causing delay and disruption of the user requested service decreasing system performance by increasing system disk, processor, and memory utilization, thereby increasing cost to the entity providing the service.

For example, a user invokes application programming interface (API)_1 of a container corresponding to a requested service to start a long running (e.g., greater than 10 minutes) serverless application function in the FaaS computing execution model on the container orchestration platform. The code of the serverless application function includes a call to an external service or system (e.g., a database containing information needed for the service). API_1 invokes the external service for a response to the requested service. However, prior to receiving the response from the external service, the FaaS computing execution model of the container orchestration platform shuts down the container running the service because the defined maximum execution time threshold had been exceeded. As a result, the response from the external service is now sent to storage and a new service container, which does not include the context of the service container that was shutdown, is generated causing execution failure of API_1. Consequently, the user now has to invokes API_2 of the new service container to retrieve the response from storage causing an increase in system disk, processor, and memory utilization.

Illustrative embodiments enhance serverless application function execution by removing execution time limitations for long running serverless application functions in a container orchestration platform using a callback tag added to the code of the serverless application function. After a service request is sent out to an external service or system, illustrative embodiments create a checkpoint for the container corresponding to the requested service and then shutdown the pod of the container. While the term pod is generally used in the Kubernetes paradigm, the term as used herein is not limited to that environment but rather refers to any grouping of one or more containers where application workloads are deployed. After receiving a response to the service request from the external service, illustrative embodiments recover the container corresponding to the requested service using the checkpoint to process the service response from the external service. As a result, illustrative embodiments decrease system resource utilization (e.g., disk, processor, memory, and the like) and, therefore, decrease total cost by using the same container to continue to run the application workload for the requested service.

During application development, a user (e.g., an application developer or system operator) of an entity (e.g., an enterprise, company, business, organization, institution, agency, or the like) uploads code of a serverless application function, which corresponds to a service of the entity, to an API server of a controller node in a container orchestration platform. The API server sends the code of the serverless application function to a callback detector of the controller node. The callback detector scans the code of the serverless application function to determine whether the code indicates that the serverless application function will run for more than the defined maximum threshold amount of time (e.g., greater than 10 minutes) to generate a response to a user request for the service or will call an external service for the response. If the callback detector determines that the code of the serverless application function does indicate the serverless application function will run for more than the defined maximum threshold amount of time or will call an external service, then the callback detector adds or inserts a callback tag to the code of the serverless application function. The callback detector then stores the code of the serverless application function with the added callback tag in a data store of the controller node for future reference.

During runtime, a user (e.g., a customer of the entity) requests a service of a host node in the container orchestration platform via an ingress gateway of the host node. The service requested by the user corresponds to the serverless application function with the callback tag added to its code. The host node utilizes a callback checker to access the code of the serverless application function stored in the data store of the controller node. The callback checker scans the code of the serverless application function to determine whether the code includes a callback tag. In response to the callback checker determining that the code of the serverless application function does include a callback tag, the callback checker adds an include_callback parameter in a header of the request for the service. Components of the host node utilize the include_callback parameter in the header to generate and retrieve a checkpoint of an image of a container corresponding to the service. Then, the callback checker forwards the request for the service with the include_callback parameter included in the header to an internal proxy of a pod including a container corresponding to the service.

The internal proxy forwards the request for the service with the include_callback parameter included in the header to an egress gateway of the host node. In turn, the egress gateway forwards the request for the service with the include_callback parameter included in the header to the external service. When an autoscaler of the host node determines that the pod of the container corresponding to the service needs to be shutdown based on the defined maximum threshold amount of time being exceeded, a checkpoint generator of the autoscaler determines whether the checkpoint generator needs to generate a checkpoint (e.g., snapshot) of an image of the container corresponding to the service based on whether the include_callback parameter is included in the header of the request for the service. If the include_callback parameter is included in the header of the request for the service, then the checkpoint generator generates the checkpoint of the image of the container corresponding to the service and stores the checkpoint in the data store. It should be noted that the checkpoint only stores runtime data. As a result, the checkpoint only consumes a small amount of storage space. Then, the autoscaler shuts down the pod of the container corresponding to the service.

Subsequently, the external service sends a response to the request for the service with the include callback parameter included in the header to the egress gateway of the host node. The egress gateway forwards the response to the request for the service with the include_callback parameter included in the header to a checkpoint activator. The checkpoint activator checks the response to the request for service forwarded from the egress gateway to determine whether the include_callback parameter is included in the header. If the checkpoint activator determines that the include_callback parameter is included in the header of the response, then the checkpoint activator retrieves the checkpoint of the image of the container corresponding to the service from the data store. The checkpoint activator then restores the same container using the checkpoint to process the response to the request for the service. If the checkpoint activator determines that an include_callback parameter was not included in the header, then the checkpoint activator directs the activator to activate a new container to process the response to the request for the service. Afterward, host node sends the response to the client device of the customer that requested the service.

Thus, illustrative embodiments provide one or more technical solutions that overcome a technical problem with executing a serverless application function that is long running or calls an external service using a same container even though a defined maximum amount of execution time has been exceeded and the container's pod has been shut down in a FaaS computing execution model on a container orchestration platform. As a result, these one or more technical solutions provide a technical effect and practical application in the field of serverless applications.

With reference now to FIG. 3, a diagram illustrating an example of a container orchestration platform is depicted in accordance with an illustrative embodiment. Container orchestration platform 300 may be implemented in a network of data processing systems, such as network data processing system 100 in FIG. 1. Container orchestration platform 300 is a system of hardware and software components for executing a serverless application function, which corresponds to a user-requested service, that is long running or calls an external service using the same container to run the serverless application function after expiration of a defined maximum threshold amount of execution time based on a callback tag added to code of the serverless application function.

In this example, container orchestration platform 300 includes controller node 302, host node 304, external service 306, client device 308, and client device 310. Controller node 302 and host node 304 may be, for example, server 104 and server 106 in FIG. 1. Client device 308 and client device 310 may be, for example, client 110 and client 112 in FIG. 1. External service 306 may be, for example, a remote database system or the like. In addition, external service 306 may represent a plurality of different external services or systems that provide information and data corresponding to requested services.

Controller node 302 corresponds to host node 304, which performs serverless application workloads. It should be noted that host node 304 may represent a cluster of host nodes. Controller node 302 receives and tracks service requests from client device users requesting performance of services corresponding to the serverless application workloads. Controller node 302, which is a main controlling unit of a cluster of host nodes, manages the cluster's serverless application workloads and directs communication across the cluster. Host node 304 is a machine, either physical or virtual, where containers (e.g., serverless application workloads) are deployed. While the terms controller node and host node are generally used in the Kubernetes paradigm, these terms as used herein are not limited to that environment but rather refer to any type of nodes that are capable of controlling and running serverless application workloads.

In this example, controller node 302 includes API server 312, data store 314, scheduler 316, controller manager 318, and callback detector 320, which comprise the control plane of controller node 302. API server 312 provide both internal and external interfaces for container orchestration platform 300 and generates services for serverless applications. While the term API server is generally used in the Kubernetes paradigm, the term as used herein is not limited to that environment but rather refers to any type of component that can provide both internal and external interfaces for container orchestration platform 300 and generate services for serverless applications.

Data store 314 contains configuration data of host node 304, representing the overall state of host node 304 at any given time. Data store 314 also contains code for the serverless applications, container checkpoints, and the like. API server 312 updates state of API objects in data store 314, thereby allowing entities to configure serverless application workloads across host nodes. Scheduler 316 selects which host node an unscheduled pod runs on, based on resource availability of respective host nodes. A pod is the basic unit managed by scheduler 316. Scheduler 316 tracks resource utilization on each host node to ensure that a serverless application workload is not scheduled in excess of available resources. Controller manager 318 is a reconciliation loop that drives actual cluster state toward a desired cluster state, communicating with API server 312 to create, update, and delete the resources controller manager 318 manages (e.g., pods, service endpoints, and the like).

User 322 (e.g., an application developer, system operator, or the like) of an entity (e.g., an enterprise, company, business, organization, institution, agency, or the like) utilizes client device 308 to upload code of a serverless application function, which corresponds to a service, such as service A 326, to API server 312 via an API or command line interface (CLI). API server 312 sends the code of the serverless application function to callback detector 320. Callback detector 320 scans the code of the serverless application function using, for example, natural language processing, to determine whether the code indicates that the serverless application function will run for more than the defined maximum threshold amount of time (e.g., greater than 10 minutes) to generate a response to a user request for service A 326 or will call external service 306 for the response.

If callback detector 320 determines that the code of the serverless application function does indicate the serverless application function will run for more than the defined maximum threshold amount of time or will call external service 306, then callback detector 320 adds or inserts a callback tag to the code of the serverless application function. Callback detector 320 then stores the code of the serverless application function with the added callback tag in data store 314 for future reference.

Subsequently, user 324 (e.g., a customer of the entity) utilizes client device 310 to request service A 326 via ingress gateway 328 of the host node. Service A 326 corresponds to the serverless application function with the callback tag added to its code by callback detector 320. Host node 304 utilizes callback checker 330 of activator 332 to access the code of the serverless application function stored in data store 314.

Callback checker 330 scans the code of the serverless application function using, for example, natural language processing, to determine whether the code includes a callback tag. In response to callback checker 330 determining that the code of the serverless application function does include a callback tag, callback checker 330 adds an include_callback parameter in a header of the request for the service. Then, callback checker 330 forwards the request for the service with the include_callback parameter included in the header to proxy 334 of pod 336, which includes container 338 corresponding to service A 326.

Proxy 334 forwards the request for the service with the include_callback parameter included in the header to egress gateway 340 of host node 304. In turn, egress gateway 340 forwards the request for the service with the include_callback parameter included in the header to external service 306.

When autoscaler 342 determines that pod 336 for container 338 corresponding to service A 326 needs to be shutdown based on the defined maximum threshold amount of time being exceeded, checkpoint generator 344 determines whether checkpoint generator 344 needs to generate a checkpoint (e.g., snapshot) of an image of container 338 corresponding to service A 326 based on whether the include_callback parameter is included in the header of the request for the service. If checkpoint generator 344 determines that the include_callback parameter is included in the header of the request for the service, then checkpoint generator 344 generates the checkpoint of the image of container 338 corresponding to service A 326 and stores the checkpoint in data store 314. Then, autoscaler 342 shuts down pod 336 for container 338 corresponding to service A 326.

Subsequently, external service 306 sends a response to the request for service A 326 with the include_callback parameter included in the header to egress gateway 340. Egress gateway 340 forwards the response to the request for service A 326 with the include_callback parameter included in the header to checkpoint activator 346. Checkpoint activator 346 checks the response to the request for service A 326, which was forwarded from egress gateway 340, to determine whether the include_callback parameter is included in the header. If checkpoint activator 346 determines that the include_callback parameter is included in the header of the response, then checkpoint activator 346 retrieves the checkpoint of the image of container 338 corresponding to service A 326 from data store 314 and restores or recovers container 338 using the checkpoint to process the response to the request for service A 326. If checkpoint activator 346 determines that an include_callback parameter was not included in the header, then checkpoint activator 346 directs activator 332 to activate a new container to process the response to the request for service A 326. Afterward, host node 304 sends the response to client device 310 of user 324 that requested service A 326 via ingress gateway 328.

Figure 4A:
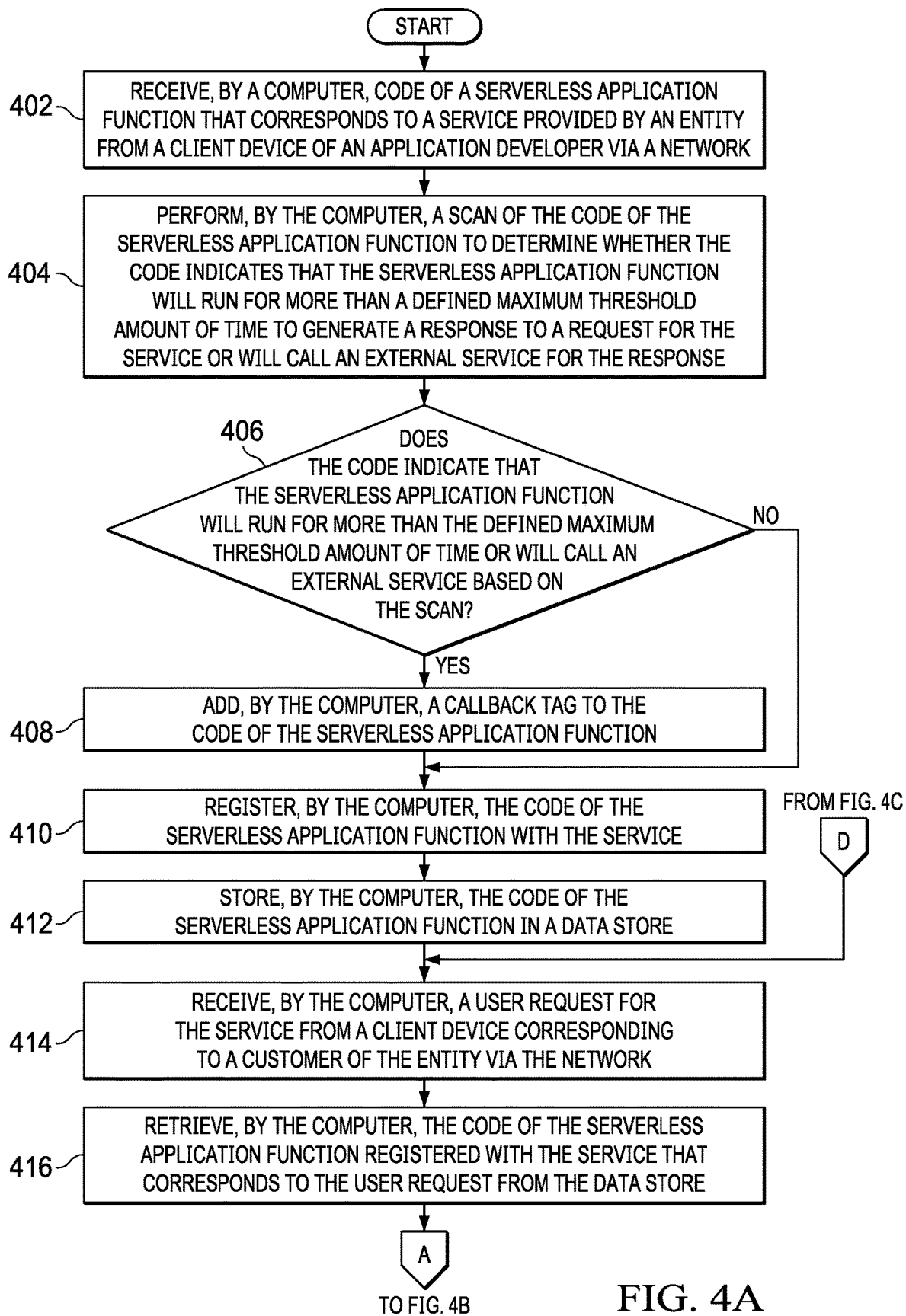
FIGS. 4A-4C are a flowchart illustrating a process for executing serverless application functions that are long running or call an external service in accordance with an illustrative embodiment.
Figure 4B:
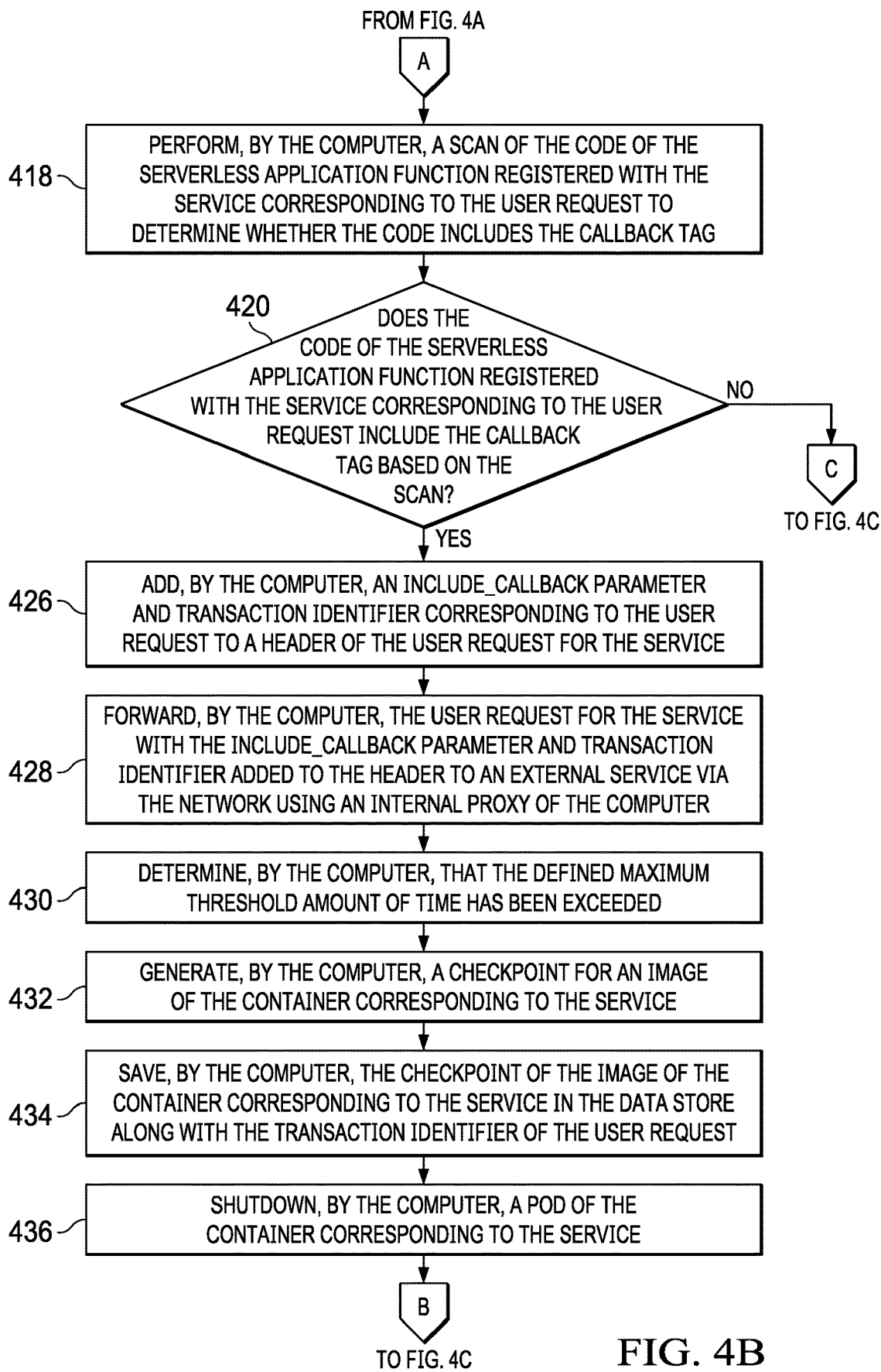
Figure 4C:
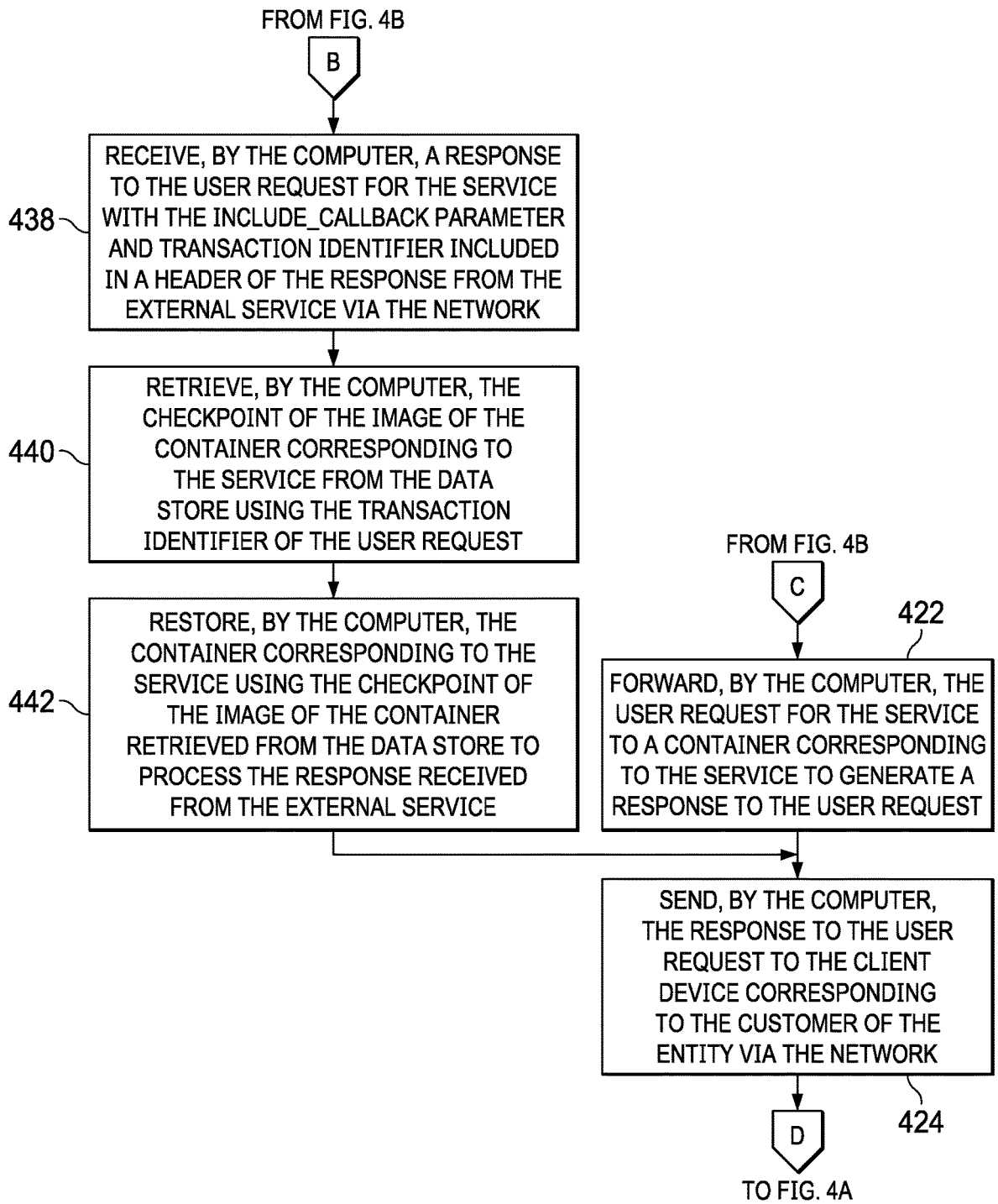

With reference now to FIGS. 4A-4C, a flowchart illustrating a process for executing serverless application functions that are long running or call an external service is shown in accordance with an illustrative embodiment. The process shown in FIGS. 4A-4C may be implemented in a computer, such as, for example, server 104 or server 106 in FIG. 1 or data processing system 200 in FIG. 2.

The process begins when the computer receives code of a serverless application function that corresponds to a service provided by an entity from a client device of an application developer via a network (step 402). The computer performs a scan of the code of the serverless application function to determine whether the code indicates that the serverless application function will run for more than a defined maximum threshold amount of time to generate a response to a request for the service or will call an external service for the response (step 404).

The computer makes a determination as to whether the code indicates that the serverless application function will run for more than the defined maximum threshold amount of time or will call an external service based on the scan (step 406). If the computer determines that the code does not indicate that the serverless application function will run for more than the defined maximum threshold amount of time or will call an external service based on the scan, no output of step 406, then the process proceeds to step 410. If the computer determines that the code does indicate that the serverless application function will run for more than the defined maximum threshold amount of time or will call an external service based on the scan, yes output of step 406, then the computer adds a callback tag to the code of the serverless application function (step 408). In addition, the computer registers the code of the serverless application function with the service (step 410). Further, the computer stores the code of the serverless application function in a data store of the computer (step 412).

Subsequently, the computer receives a user request for the service from a client device corresponding to a customer of the entity via the network (step 414). In response to receiving the user request for the service, the computer retrieves the code of the serverless application function registered with the service that corresponds to the user request from the data store (step 416). The computer performs a scan of the code of the serverless application function registered with the service corresponding to the user request to determine whether the code includes the callback tag (step 418).

The computer makes a determination as to whether the code of the serverless application function registered with the service corresponding to the user request includes the callback tag based on the scan (step 420). If the computer determines that the code of the serverless application function registered with the service corresponding to the user request does not include the callback tag based on the scan, no output of step 420, then the computer forwards the user request for the service to a container corresponding to the service to generate a response to the user request (step 422). The computer sends the response to the user request to the client device corresponding to the customer of the entity via the network (step 424). Thereafter, the process returns to step 414 where the computer waits for another user request for the service.

Returning again to step 420, if the computer determines that the code of the serverless application function registered with the service corresponding to the user request does include the callback tag based on the scan, yes output of step 420, then the computer adds an include_callback parameter and a transaction identifier corresponding to the user request to a header of the user request for the service (step 426). The computer forwards the user request for the service with the include_callback parameter and transaction identifier corresponding to the user request added to the header to an external service via the network using an internal proxy of the computer (step 428). The external service may be, for example, an external database containing information corresponding to the service.

Furthermore, the computer determines that the defined maximum threshold amount of time has been exceeded (step 430). The computer generates a checkpoint for an image of the container corresponding to the service in response to the defined maximum threshold amount of time having been exceeded (step 432). The checkpoint may be, for example, a snapshot of the image of the container at expiration of the defined maximum threshold amount of time. In addition, the computer saves the checkpoint of the image of the container corresponding to the service in the data store along with the transaction identifier of the user request (step 434). Moreover, the computer shuts down a pod of the container corresponding to the service in response to generating and saving the checkpoint for the image of the container (step 436).

Subsequently, the computer receives a response to the user request for the service with the include_callback parameter and transaction identifier of the user request included in a header of the response from the external service via the network (step 438). In response to receiving the response to the user request for the service from the external service, the computer retrieves the checkpoint of the image of the container corresponding to the service from the data store using the transaction identifier of the user request (step 440).

The computer activates the pod and restores the container corresponding to the service using the checkpoint of the image of the container retrieved from the data store to process the response received from the external service (step 442). Thereafter, the process returns to step 424 where the computer sends the response to the user request for the service to the client device corresponding to the customer of the entity via the network.

Thus, illustrative embodiments of the present invention provide a computer-implemented method, computer system, and computer program product for executing a serverless application function, which corresponds to a requested service by a user, that is long running or calls an external service using the same container to run the serverless application function after expiration of the defined maximum threshold amount of execution time based on a callback tag added to code of the serverless application function. The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for executing serverless application functions, the computer-implemented method comprising:
   receiving, by a computer, a response to a user request for a service with an include callback parameter and a transaction identifier of the user request included in a header of the response from an external service via a network, wherein the include callback parameter is added to the header in response to detecting a serverless application function for the service will run for more than a defined maximum threshold amount of time;
   generating, by the computer, a checkpoint of a container corresponding to the service using the include callback parameter;
   retrieving, by the computer, the checkpoint of the container corresponding to the service from a data store using the transaction identifier of the user request; and
   restoring, by the computer, the container corresponding to the service using the checkpoint to process the response received from the external service.

2. The computer-implemented method of claim 1 further comprising:
   sending, by the computer, the response to the user request for the service to a client device corresponding to a user that made the user request for the service via the network.

3. The computer-implemented method of claim 1 further comprising:
   receiving, by the computer, code of the serverless application function that corresponds to the service from a client device of an application developer via the network; and
   performing, by the computer, a scan of the code of the serverless application function to determine whether the code indicates that the serverless application function will run for more than a defined maximum threshold amount of time to generate the response to the user request for the service or will call the external service for the response.

4. The computer-implemented method of claim 3 further comprising:
   determining, by the computer, whether the code indicates that the serverless application function will run for more than the defined maximum threshold amount of time or will call the external service based on the scan;

adding, by the computer, a callback tag to the code of the serverless application function in response to the computer determining that the code does indicate that the serverless application function will run for more than the defined maximum threshold amount of time or will call the external service based on the scan; and storing, by the computer, the code of the serverless application function with the callback tag added to the code in the data store.

5. The computer-implemented method of claim 1 further comprising:

receiving, by the computer, the user request for the service from a client device of a user via the network;

retrieving, by the computer, code of a serverless application function registered with the service that corresponds to the user request from the data store;

performing, by the computer, a scan of the code of the serverless application function registered with the service corresponding to the user request to determine whether the code includes a callback tag; and determining, by the computer, whether the code of the serverless application function registered with the service corresponding to the user request includes the callback tag based on the scan.

6. The computer-implemented method of claim 5 further comprising:

forwarding, by the computer, the user request for the service to a container corresponding to the service to generate a response to the user request in response to the computer determining that the code of the serverless application function registered with the service corresponding to the user request does not include the callback tag based on the scan.

7. The computer-implemented method of claim 5 further comprising:

adding, by the computer, the include callback parameter and the transaction identifier corresponding to the user request to the header of the user request for the service in response to the computer determining that the code of the serverless application function registered with the service corresponding to the user request does include the callback tag based on the scan; and forwarding, by the computer, the user request for the service with the include callback parameter and the transaction identifier corresponding to the user request added to the header to the external service via the network using a proxy.

8. The computer-implemented method of claim 1 further comprising:

determining, by the computer, that a defined maximum threshold amount of time has been exceeded;

generating, by the computer, the checkpoint for the container corresponding to the service in response to the defined maximum threshold amount of time having been exceeded;

saving, by the computer, the checkpoint of the container corresponding to the service in the data store along with the transaction identifier of the user request; and shutting down, by the computer, a pod of the container corresponding to the service in response to generating and saving the checkpoint for the container.

9. The computer-implemented method of claim 8, wherein the checkpoint is a snapshot of an image of the container at expiration of the defined maximum threshold amount of time.

10. A computer system for executing serverless application functions, the computer system comprising:

a bus system;

a storage device connected to the bus system, wherein the storage device stores program instructions; and a processor connected to the bus system, wherein the processor executes the program instructions to:

receive a response to a user request for a service with an include callback parameter and a transaction identifier of the user request included in a header of the response from an external service via a network, wherein the include callback parameter is added to the header in response to detecting a serverless application function for the service will run for more than a defined maximum threshold amount of time;

generate a checkpoint of a container corresponding to the service using the include callback parameter;

retrieve the checkpoint of the container corresponding to the service from a data store using the transaction identifier of the user request; and restore the container corresponding to the service using the checkpoint to process the response received from the external service.

11. The computer system of claim 10, wherein the processor further executes the program instructions to:

send the response to the user request for the service to a client device corresponding to a user that made the user request for the service via the network.

12. A computer program product for executing serverless application functions, the computer program product comprising a computer-readable storage medium having program instructions embodied therewith, the program instructions executable by a computer to cause the computer to:

receiving, by the computer, a response to a user request for a service with an include callback parameter and a transaction identifier of the user request included in a header of the response from an external service via a network, wherein the include callback parameter is added to the header in response to detecting a serverless application function for the service will run for more than a defined maximum threshold amount of time;

generating, by the computer, a checkpoint of a container corresponding to the service using the include callback parameter;

retrieving, by the computer, the checkpoint of the container corresponding to the service from a data store using the transaction identifier of the user request; and restoring, by the computer, the container corresponding to the service using the checkpoint to process the response received from the external service.

13. The computer program product of claim 12 further comprising:

sending, by the computer, the response to the user request for the service to a client device corresponding to a user that made the user request for the service via the network.

14. The computer program product of claim 12 further comprising:

receiving, by the computer, code of the serverless application function that corresponds to the service from a client device of an application developer via the network; and performing, by the computer, a scan of the code of the serverless application function to determine whether the code indicates that the serverless application function will run for more than a defined maximum threshold amount of time to generate the response to the user request for the service or will call the external service for the response.

15. The computer program product of claim 14 further comprising:
- determining, by the computer, whether the code indicates that the serverless application function will run for more than the defined maximum threshold amount of time or will call the external service based on the scan;
- adding, by the computer, a callback tag to the code of the serverless application function in response to the computer determining that the code does indicate that the serverless application function will run for more than the defined maximum threshold amount of time or will call the external service based on the scan; and
- storing, by the computer, the code of the serverless application function with the callback tag added to the code in the data store.

16. The computer program product of claim 12 further comprising:
- receiving, by the computer, the user request for the service from a client device of a user via the network;
- retrieving, by the computer, code of a serverless application function registered with the service that corresponds to the user request from the data store;
- performing, by the computer, a scan of the code of the serverless application function registered with the service corresponding to the user request to determine whether the code includes a callback tag; and
- determining, by the computer, whether the code of the serverless application function registered with the service corresponding to the user request includes the callback tag based on the scan.

17. The computer program product of claim 16 further comprising:
- forwarding, by the computer, the user request for the service to a container corresponding to the service to generate a response to the user request in response to the computer determining that the code of the serverless application function registered with the service corresponding to the user request does not include the callback tag based on the scan.

18. The computer program product of claim 16 further comprising:
- adding, by the computer, the include callback parameter and the transaction identifier corresponding to the user request to the header of the user request for the service in response to the computer determining that the code of the serverless application function registered with the service corresponding to the user request does include the callback tag based on the scan; and
- forwarding, by the computer, the user request for the service with the include callback parameter and the transaction identifier corresponding to the user request added to the header to the external service via the network using a proxy.

19. The computer program product of claim 12 further comprising:
- determining, by the computer, that a defined maximum threshold amount of time has been exceeded;
- generating, by the computer, the checkpoint for the container corresponding to the service in response to the defined maximum threshold amount of time having been exceeded;
- saving, by the computer, the checkpoint of the container corresponding to the service in the data store along with the transaction identifier of the user request; and
- shutting down, by the computer, a pod of the container corresponding to the service in response to generating and saving the checkpoint for the container.

20. The computer program product of claim 19, wherein the checkpoint is a snapshot of an image of the container at expiration of the defined maximum threshold amount of time.

* * * * *